United States Patent
Walia et al.

(10) Patent No.: US 10,713,633 B2
(45) Date of Patent: Jul. 14, 2020

(54) COMPUTING DEVICE AND METHOD TO PERFORM A DATA TRANSFER USING A DOCUMENT

(71) Applicant: THE TORONTO-DOMINION BANK, Toronto (CA)

(72) Inventors: Sarabjit Singh Walia, Toronto (CA); Vipul Kishore Lalka, Toronto (CA); John Jong-Suk Lee, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 272 days.

(21) Appl. No.: 15/660,145

(22) Filed: Jul. 26, 2017

(65) Prior Publication Data

US 2019/0034894 A1    Jan. 31, 2019

(51) Int. Cl.
| | | |
|---|---|---|
| G06Q 20/14 | (2012.01) | |
| G06Q 40/00 | (2012.01) | |
| G06Q 20/32 | (2012.01) | |
| G06Q 20/10 | (2012.01) | |
| G06F 3/0488 | (2013.01) | |
| G06F 3/0482 | (2013.01) | |

(52) U.S. Cl.
CPC ........... *G06Q 20/14* (2013.01); *G06Q 20/102* (2013.01); *G06Q 20/3276* (2013.01); *G06Q 40/12* (2013.12); *G06F 3/0482* (2013.01); *G06F 3/04883* (2013.01)

(58) Field of Classification Search
CPC ...... G06Q 10/10; G06Q 20/10; G06Q 20/042; G06F 3/12
See application file for complete search history.

(56) References Cited

U.S. PATENT DOCUMENTS

| | | | | |
|---|---|---|---|---|
| 8,504,470 B1 * | 8/2013 | Chirehdast | ............. | G06Q 40/00 |
| | | | | 705/38 |
| 8,566,186 B1 * | 10/2013 | Heit | ...................... | G06Q 10/10 |
| | | | | 705/30 |

(Continued)

FOREIGN PATENT DOCUMENTS

JP    02007334444    *    6/2006

OTHER PUBLICATIONS

Caroline Baldwin, Visa is partnering with Blippar to introduce augmented reality payments, Article, Jun. 13, 2016, 2 pages, http://www.essentialretail.com/ecommerce/article/575e64c572731-visa-launches-augmented-reality-payment-technology.

(Continued)

*Primary Examiner* — Daniel S Felten

(57) ABSTRACT

There is provided a computing device and method to perform a data transfer using a document. Data to define at least one parameter of a data transfer is defined from data in the document. The document may have text characters or images of text characters (or both) for the data. A GUI may display the document and receive input to identify the data and define the at least one parameter. The document image may be processed to determine the text characters such as by OCR. The document may be a photo (image) captured by a camera on or coupled to the computing device. A GUI may be defined to provide workflow to define the data transfer signal such as a message. Functionality to capture text characters from documents, particularly images, may be added to applications such as via a plug in or otherwise.

19 Claims, 13 Drawing Sheets

(56) References Cited

U.S. PATENT DOCUMENTS

| | | | | |
|---|---|---|---|---|
| 8,660,943 B1* | 2/2014 | Chirehdast | ............. | G06Q 40/00 705/38 |
| 8,811,711 B2* | 8/2014 | Calman | ................ | G06Q 20/042 382/135 |
| 8,995,012 B2* | 3/2015 | Heit | ...................... | G06K 9/186 358/1.9 |
| 9,071,745 B2* | 6/2015 | Bocharov | ................ | H04N 1/23 |
| 9,100,576 B2* | 8/2015 | Fan | ...................... | G06K 7/1452 |
| 9,208,551 B2* | 12/2015 | Madhani | ................ | G06K 9/036 |
| 9,230,382 B2* | 1/2016 | Smith | ..................... | G07D 7/00 |
| 9,241,102 B2* | 1/2016 | Bala | ...................... | G06T 3/4092 |
| 10,157,333 B1* | 12/2018 | Wang | .................... | G06K 9/6267 |
| 2003/0037341 A1* | 2/2003 | Van Der Meulen | ... | G08C 17/02 725/143 |
| 2007/0211071 A1* | 9/2007 | Slotznick | .............. | G06F 16/957 345/594 |
| 2008/0169343 A1* | 7/2008 | Skaaksrud | ............. | G06Q 10/08 235/376 |
| 2010/0041442 A1* | 2/2010 | Hong | .................. | G06F 3/04817 455/566 |
| 2010/0174647 A1* | 7/2010 | Kowalchyk | ............ | G06Q 20/02 705/44 |
| 2012/0303476 A1* | 11/2012 | Krzyzanowski | .......... | G06F 8/60 705/26.5 |
| 2013/0124414 A1* | 5/2013 | Roach | .................... | G06Q 20/10 705/44 |
| 2013/0318436 A1* | 11/2013 | Steinhauser | ........ | H04L 67/2823 715/249 |
| 2014/0156435 A1* | 6/2014 | Rahman | ................. | G06Q 20/10 705/21 |
| 2015/0015909 A1* | 1/2015 | Kaida | ................... | G06F 21/608 358/1.14 |

OTHER PUBLICATIONS

Erika Napoletano, The New Reality: How AR and VR Are Transforming Payment Technology, Article, Nov. 1, 2016, 11 pages, http://paymentweek.com/2016-11-1-the-new-reality-how-ar-and-vr-are-transforming-payment-technology-11873/.

Miguel Santos, Paypal Introduces Payment Via Augmented Reality, Article, May 6, 2016, 3 pages, https://futurism.com/paypal-introduces-payment-via-augmented-reality/.

* cited by examiner

Bill Payments by Photo

210

Municipal Electric Distribution System Limited

YOUR ELECTRICITY BILL

MUNICIPAL EDS
*Your first call when sparks fly*

306

Account Number
012345678
To be used for payments

| Statement Date: | Apr. 01, 2016 |
| Amount Due: | $123.45 |
| Due Date: | Apr. 21, 2016 |
| Amount Paid | |

304

Meter Number
01234567
Type: Residential

Billing Address:
1234 Pretend Lane
YourTown, OH 00000

Service Location:
1234 Pretend Lane
YourTown, OH 00000

555.123.4567    municipaleds.com
Interest is charged on any amount nor received by the due date above at a rate of X% compounded monthly...

Your Electricity Charges
...

Compare your daily usage:

Date                           KwH Usage

Mar. 31    ▬▬▬▬▬         N.NNN
Mar. 15    ▬▬▬▬▬▬▬      N.NNN

204

Select Amount to Be Paid 302           106

Fig. 3    300

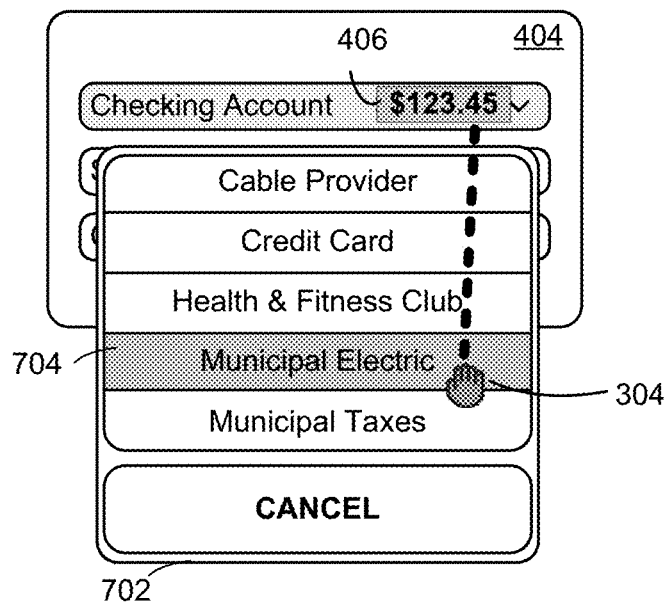
Fig. 7    700
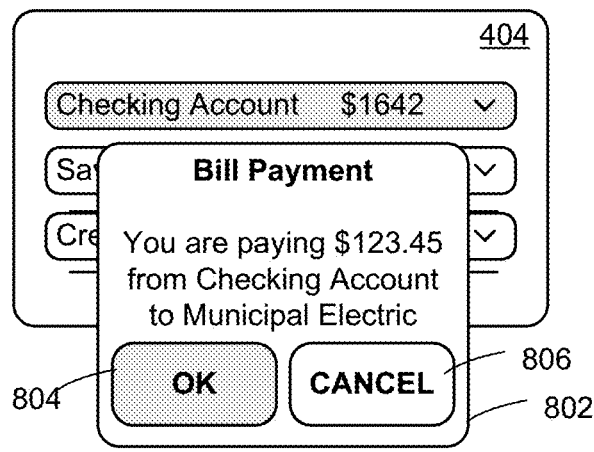
Fig. 8    800

COMPUTING DEVICE AND METHOD TO PERFORM A DATA TRANSFER USING A DOCUMENT

FIELD

The present disclosure relates to computer interfaces for computer devices configured to communicate and more particularly to a computing device and method to perform a data transfer using a document.

BACKGROUND

Graphical user interfaces (GUIs) for functions and applications for computers and other devices enable users to receive information and provide input, for example, to invoke a function, feature or service. Graphical user interfaces can play a significant role in the user experience and satisfaction in dealing with the associated device. Complicated user interfaces may result in erroneous user input. Such input may waste computer or other resources through unnecessary action while performing or partially performing undesired functions, features or services or in correcting the input. As well, some GUIs are more resource intensive than others, using computer resources unnecessarily.

By way of example, often there is a need to communicate information (data) from a document to a recipient using a communication device. The document may be a paper document such as one received in the mail or otherwise or may be an electronic document received by the communication device. Typing in the data, which may be a length of text comprising numeric, alphanumeric or both types of characters, can be cumbersome. Typing in the data can be prone to errors, requiring retyping to correct the errors before sending or retyping and resending if the erroneous data is sent.

SUMMARY

There is provided a computing device and method to perform a data transfer using a document. Data to define at least one parameter of a data transfer is defined from data in the document. The document may have text characters or images of text characters for the data. A GUI may be provided to display the document and receive input to identify the data and define the at least one parameter. The document image may be processed to determine the text characters such as by OCR. The document may be a photo (image) captured by a camera on or coupled to the computing device. A GUI may be defined to provide workflow to define the data transfer signal such as a message. Functionality to capture text characters from documents, particularly images, may be added to applications such as via a plug in or otherwise.

In one aspect there is provided a computing device comprising: a processor; a display device coupled to the processor; a communications component coupled to the processor; an input device coupled to the processor; and a storage device coupled to the processor, the storage device storing instructions to configure operation of the computing device when executed by the processor. The computing device is configured to: receive a document including data to define at least one parameter of a data transfer, the data comprising text characters or an image of text characters; display a graphical user interface (GUI) on the display device, the GUI prompting for input via the input device; display the document on the display device with the GUI; receive an input identifying the data; define the at least one parameter using the data and generate and send, via the communications component, a data transfer signal to a data transfer system to effect the data transfer, the signal including the at least one parameter defined using the data.

The input device may be a touch sensitive device and the input may be a gesture.

The computing device of may comprise a camera and be configured to receive the document as an image from the camera.

The computing device may be configured to receive the document using the communications component.

The data may comprise an image of text characters and wherein the computing device may be further configured to convert the image using text recognition.

The at least one parameter may comprise at least one of a data type, a data quantum, and a recipient to effect the data transfer.

The document may be a bill and the at least one parameter may be at least one of an amount payable data type, an amount payable data quantum and a bill payee. The computing device of may be further configured to: present an allocation source interface in the GUI via the display device with which to determine the allocation source to pay the bill; receive an allocation source input to identify the allocation source; and generate the data transfer signal to include the allocation source.

The allocation source interface may present a plurality of allocation sources selected from bank accounts, credit cards or other allocation sources for selection.

The allocation source interface may be an overlay displayed over the bill in the GUI and/or presented in response to receiving an amount payable input to define the amount payable data quantum.

The amount payable input and allocation source input may be portions of a same continuous gesture interacting with the GUI. The amount payable input may comprise a pause or tap over data in the document comprising the amount payable data quantum as displayed in the GUI. The allocation source input may comprise a swipe to the allocation source and a pause over the allocation source as displayed in the GUI.

The computing device may be further configured to generate the signal to include an allocation destination where the amount payable data quantum is to be paid to the bill payee. The computing device may be further configured to determine allocation destination information by: receiving an account input identifying an account or other identifier on the bill with which to identify the allocation destination; and defining the allocation destination in response to the account input. The computing device may be further configured to determine an allocation destination information by: presenting a allocation destination interface in the GUI via the display device with which to determine the allocation destination, the allocation destination interface presenting a plurality of allocation destinations; and receiving an allocation destination input selecting the allocation destination.

The allocation destination interface may be an overlay displayed over the bill in the GUI. The allocation destination interface may be presented in response to receiving an allocation source input. The allocation destination input may be a portion of a continuous swipe in combination with at least one of an amount payable input and an allocation source input.

In one aspect there is provided a computer-implemented method executed by one or more processing units of a computing device. The method comprises: receiving a document including data to define at least one parameter of a data transfer, the data comprising at least one of text characters and an image of text characters; displaying a graphical user interface (GUI) on a display device coupled to the computing device, the GUI prompting for input via an input device; displaying the document on the display device with the GUI; receiving an input identifying the data; defining the at least one parameter using the data; and generating and sending, via a communications component, a data transfer signal to a data transfer system to effect the data transfer, the signal including the at least one parameter defined using the data.

In one aspect there is provided a computer readable medium storing instructions and/or data, which when executed by a processor of a computing device, the processor coupled to a memory, configure the computing device to: receive a document including data to define at least one parameter of a data transfer, the data comprising at least one of text characters and an image of text characters; display a graphical user interface (GUI) on a display device coupled to the computing device, the GUI configured to prompt for input via an input device; display the document on the display device with the GUI; receive an input identifying the data; define the at least one parameter using the data; and generate and send, via a communications component, a data transfer signal to a data transfer system to effect the data transfer, the signal including the at least one parameter defined using the data.

These and other aspects will be apparent to those of ordinary skill in the art.

BRIEF DESCRIPTION OF THE DRAWINGS

FIGS. 2-11 are diagrams illustrating example graphical user interfaces, in accordance with one or more aspects of the present disclosure.

DETAILED DESCRIPTION

Figure 1:
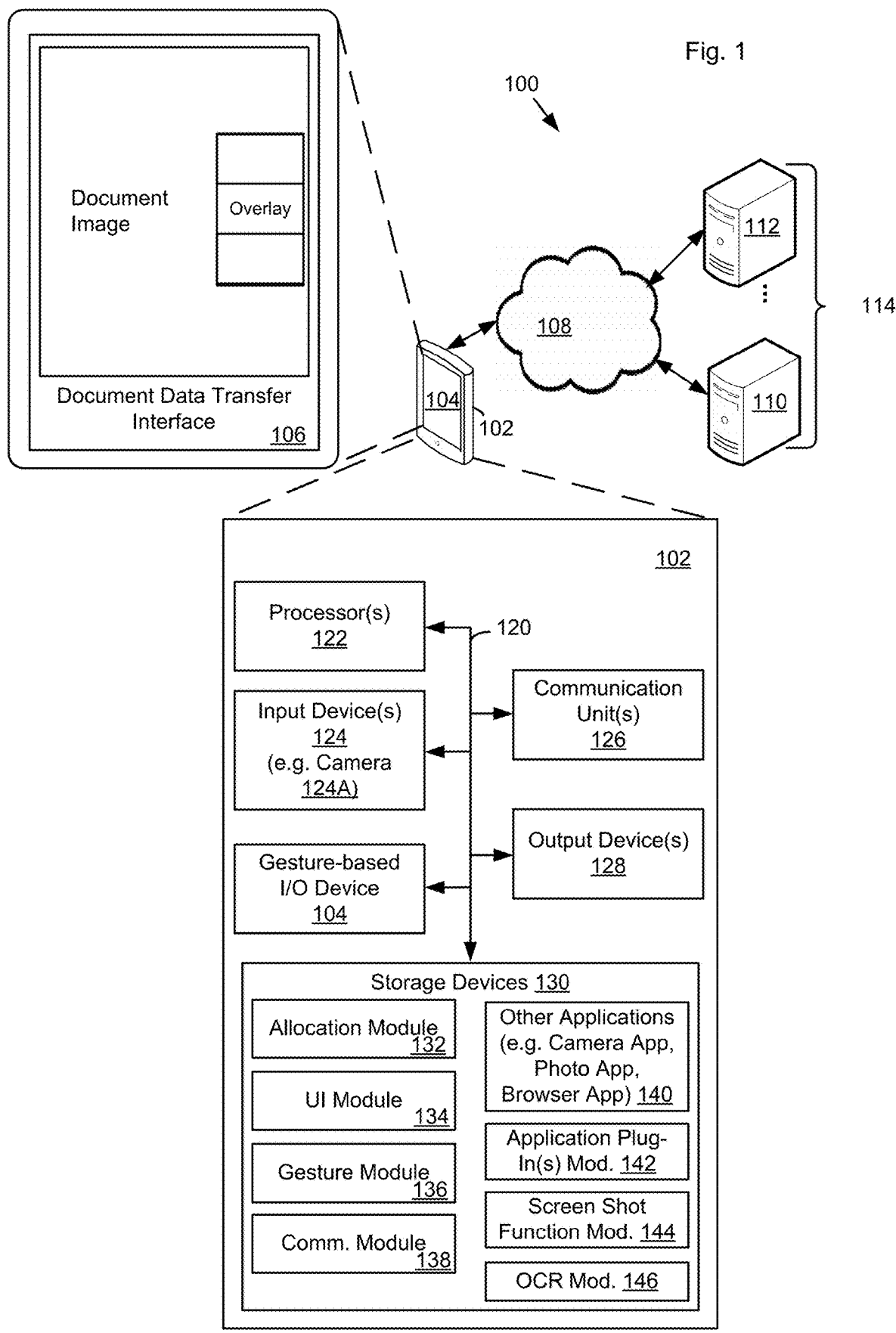
FIG. 1 is a block diagram illustrating an example computing device communicating in a communication network and configured to output a graphical user interface for display to a display device (e.g. a gesture-based input/output (I/O) device), in accordance with one or more aspects of the present disclosure.

FIG. 1 is a block diagram of a representative computer network 100 illustrating an example computing device 102 communicating in a communication network 108 and configured to output for display to a display device 104 (e.g. a gesture-based input/output (I/O) device) a graphical user interface 106 for display, in accordance with one or more aspects of the present disclosure. Simplified details of device 102 are illustrated in and enlargement thereof as are simplified details of gesture-based I/O device 104 shown in an enlargement thereof. Computing device 102 is communicating using one or more communication networks 108 with one or more other computing devices (e.g. 110 and 112 and collectively 114, for example, servers). Computing device 102, using GUI 106, may receive input to determine data from a document to and generate and output a signal for a data transfer, providing information to one or more of the other computing devices 114. The document may include recipient information for the data transfer to perform an allocation. An allocation may comprise any of a variety of transactions such as a financial transaction, bill payment, money transfers, stock purchases or sales, asset purchases or sales, transfers, currency conversions, etc.

In the example of FIG. 1, computing device 102 is a mobile phone. Other examples of computing device 102 may be a tablet computer, a personal digital assistant (PDA), a laptop computer, a tabletop computer, a portable gaming device, a portable media player, an e-book reader, a watch, or another type of computing device. In the example of FIG. 1, other computing devices 114 are servers, though these may be intermediary devices, with ultimate data transfer communications being communicated to other devices. While data transfers are typically performed by servers, other types of computing devices may be utilized such as mainframes, and other higher performance computing devices, etc.; however, data transfers may be performed on personal computers, workstations, laptops, etc. Each of these is an example of a computing device having at least one processing device and memory.

It will be understood that computing device 102 may not communicate directly with the intended recipient computing device performing an activity (e.g. transaction) associated with the data transfers per se but may communicate with a server configured to receive and initially handle requests from a mobile device (e.g. a mobile processing server), a Web server or other type of server. A data transfer may be a component of a transaction for example, such as a bill payment, money transfer, on-line purchase (e.g. for goods or services, license or permit purchase or renewal), on-line filing (e.g. via electronic form) or other transaction. To complete a transaction, computing device 102 may communicate with more than one server. Other configurations are also known to those skilled in the art.

Computing device 102 is coupled for communication to a wide area network (WAN) 108 such as the Internet. Network 108 is coupled for communication with a plurality of computing devices (e.g. servers 110 and 112). It is understood that representative computer network 100 is simplified for illustrative purposes. Additional networks may also be coupled to network 108 such as a wireless network and/or a local area network (LAN) between WAN 108 and computing device 102 (not shown).

Although the present disclosure illustrates and discusses a gesture-based I/O device 104 primarily in the form of a screen device with IO capabilities (e.g. touchscreen), other examples of gesture-based I/O devices may be utilized which may detect movement and which may not comprise a screen per se. Computing device 102 may receive gesture-based input from a track pad/touch pad, one or more cameras, or another presence or gesture sensitive input device, where presence means presence aspects of a user including for example motion of all or part of the user or an object (e.g. a pointer).

Computing device 102 may generate output for display on a screen display device or in some examples, for display by a projector, monitor or other display device. It will be understood that gesture-based I/O device 104 as a screen device may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

Gesture-based I/O device 104 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 104. Gesture-based I/O device 104 and may also include non-tap gestures. Gesture-based I/O device 104 may output or display information, such as a graphical user interface (106), to a user. The gesture-based I/O device 104 may present various applications, functions and capabilities of the computing device 102 including, for example, messaging applications, telephone communications, contact and calendar applications, Web browsing applications, game applications, e-book applications and financial, payment and other transaction applications or functions among others.

The one or more other computing devices 114 (e.g. servers 114) may be configured to perform one or more types of data transfer such as an allocation (a type of transaction) as instructed by computing device 102. Allocations may relate to an account of a user of computing device 102 held with a financial service provider for example. Servers 114 may store account data, which may include account identification information identifying one or more accounts of customers of a financial service provider (e.g., a business entity associated with servers 114). In one example, account identification information may include financial service account information. For example, such financial service account information may include a checking account, a savings account, a revolving credit line, an account linked to a credit or debit card, a brokerage account, and any additional or alternate account provided or supported by the financial service provider (e.g., an issuing bank or financial institution). In other embodiments, account data may include information identifying investment portfolios held by one or more customers of the financial service provider. Servers 114 may store transaction data may include information identifying one or more transactions involving one or more customers or accounts of a financial service provider. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial service provider or other entity.

FIG. 1 shows an enlargement of device 102, in accordance with one or more aspects of the present disclosure, for example, to provide a system and perform a method to complete as data transfer such as an allocation. Computing device 102 comprises one or more processors 122, one or more input devices 124, gesture-based I/O device 104, one or more communication units 126 and one or more output devices 128. Computing device 102 also includes one or more storage devices 130 storing one or more modules such as allocation module 132, UI module 134, gesture module 136 and communication module 138. Other modules include other applications module 140, application plug-in(s) module 142 providing plug-ins for other applications, screen shot function module 144 (which may be a component of an operating system (not shown)) and an optical character recognition module 146). Other applications module 140 may include all or some of a camera application for a camera input device 124A (e.g. an instance of input device(s) 124), a photo application to manage images (still or moving (e.g. video), and a browser application, for example, for Internet HTTP and related communications. Other modules may include other communications applications such as email, SMS/text/IM etc. It is understood that operations may not fall discretely within the modules 132-146 of FIG. 1 such that one module may assist with the functionality of another.

Communication channels 120 may couple each of the components 104, 122, 124, 126, 128 and 130 (and modules therein), for inter-component communications, whether communicatively, physically and/or operatively. In some examples, communication channels 220 may include a system bus, a network connection, an inter-process communication data structure, or any other method for communicating data.

One or more processors 122 may implement functionality and/or execute instructions within computing device 102. For example, processors 122 may be configured to receive instructions and/or data from storage devices 130 to execute the functionality of the modules shown in FIG. 1, among others (e.g. operating system, additional applications, etc. that are not shown). Computing device 102 may store data/information to storage devices 130, which may comprise, for example, an image of a document. Some of the functionality is described further herein below.

One or more communication units 126 may communicate with external devices such as servers 112 and 114, etc. via one or more networks (e.g. 108) by transmitting and/or receiving network signals on the one or more networks. The communication units may include various antennae and/or network interface cards, etc. for wireless and/or wired communications.

Input and output devices may include any of one or more buttons, switches, pointing devices, one or more cameras, a keyboard, a microphone, one or more sensors (e.g. biometric, etc.) a speaker, a bell, one or more lights, etc. One or more of same may be coupled via a universal serial bus (USB), Bluetooth™ or other communication channel (e.g. 126). That is, input and output devices may be on device 102 or coupled thereto via wired or wireless communication.

The one or more storage devices 130 may store instructions and/or data for processing during operation of computing device 102. The one or more storage devices may take different forms and/or configurations, for example, as short-term memory or long-term memory. Storage devices 130 may be configured for short-term storage of information as volatile memory, which does not retain stored contents when power is removed. Volatile memory examples include random access memory (RAM), dynamic random access memory (DRAM), static random access memory (SRAM), etc. Storage devices 130, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Allocation module 132 (an instance and type of a data transfer module) may be configured to obtain allocation information to instruct the performance of an allocation such as on behalf of the user. Allocation module 132 may cooperate with UI module 134 and gesture module 136 to present a user interface and receive gesture input via gesture-based I/O device 104. Certain information to present in the user interface may be obtained from servers 114 for example, looking up data stored on behalf of a user instructing the allocation. Certain information will be present in the user interface from a document received by the device 102. The document may be received electronically via communication unit(s) 126, via a storage device coupled to the computing device (e.g. flash or SD or other storage type), or by capturing an image of the document using the camera 124A.

Allocation information may be determined at least in part by the user input and communicated to at least one of the servers 114 to perform the allocation. In one example, the allocation may be a money transfer, transferring an amount of money from a source account (e.g. checking account) to a destination account (such as a saving account). In one example, allocation module 132 may comprise an application (whether native or browser-based) from a financial service provider where the user has one or more accounts. Allocation module 132 may also be configured to provide functionality to transfer money to other accounts or destinations such as a credit card, investment account, mortgage, bill payment, another individual, to perform investment sales or purchases, to perform currency purchases, etc. For security reasons and for data currency reasons, it may be preferred to store certain allocation information (e.g. user accounts held at a financial service provider) and other related information (e.g. account balances, personal information, etc.) remotely in respective of computing device 102, obtaining such information just prior to instructing an allocation, such as after a secure sign-on operation on start-up of allocation module 132 or after a period of inactivity. Allocation information and other related information may be only stored temporarily on computing device 102.

Gesture module 136 may receive input from gesture-based I/O device 104 entered via the touchscreen, processing same for communication with allocation module 132 and/or UI module 134 and/or others (e.g. 140-146, among others). In some configurations, the gesture module 136 may be a component of an operating system. In response to input detected by gesture-based I/O device 104, gesture module 136 may receive information for processing. The information may be aggregated or grouped to generate one or more touch or gesture events. The events may include data representing a location on gesture-based I/O device 104 where the input is received, a time when the input or part thereof is received at the location, and/or a direction component (e.g. push down, pull up, lateral motion). The touch events may be communicated to the allocation module 132 and/or UI module 134 for further processing.

Allocation module 132 and/or UI module 134 may use the data associated with the one or more touch events to determine a response. In one example, allocation module 132 may, based on the location components of these touch events, obtain data from a document displayed via gesture-based I/O device 104 for the data transfer. A document may be defined according to a document type in respective document formats. Document types may include images (e.g. JPEG, TIFF, PNG, etc. are some image document formats where data therein is not stored in a text manner (e.g. ASCII or others)) or text based documents (Email, SMS, HTML or other mark-up, Word, etc. are some text based document formats). Some document formats, such as PDF, may support documents of either document type such that data therein may be image or text based or a combination. Data from a document of an image type (or including an image) may be obtained by performing optical character recognition on all or some of the document's image(s). Documents received in text based form may be communicated in that form to the allocation module 132, if configured to handle same, for display in a GUI 106 on gesture-based I/O device 104 or may be converted to an image form, such as by a screen shot (e.g. using module 144) taken when the document is displayed using an appropriate viewer/application.

To complete a data transfer various parameters are determined. At a minimum a data transfer is a signal, usually encoding a message having a predefined format. The message (and hence the signal) includes content (i.e. data) and at least one destination for message delivery. Often a message source is also included, among other parameters. Often at least some of the parameters are predefined. Some parameters may be selectable from predefined options when defining the message. Applications on device 102 are typically dedicated and may perform data transfers to provide defined services. For example, an application on device 102 performing a data transfer may be a music streaming application, or a financial (banking) application, among others. Such an application will typically send a data transfer to the same destination for processing (or at least usually not enable a user option to select different destinations). The source is usually the same (i.e. the device or a user account associated therewith) though a device may be configured with more than one account, one of which is selected to determine the source before the message is sent. Usually it is the message content that is variable for such data transfers.

In the present disclosure, at least one parameter for the data transfer is determined from data in the document. One parameter may be the (content) data to be transferred. Data transfers may be components of a transaction as noted above. In some transactions such as a purchase or a bill payment, etc., intermediary computers (servers) process the data transfers for parties to the transaction. A data transfer then may have content which includes the identification of such parties (or accounts thereof). In a bill payment scenario, the message content may include an amount to be paid, the bill payee (account destination) and an account source (usually associated to the data transfer sender) from which the amount is to be taken to pay the bill. A purchase is similar, and may identify further information such as what is being purchased, delivery information, etc. A document may have data to determine any of the data transfer parameters but typically will have data for the content of the transfer. The document data may actually comprise the data to be transferred or may be data used to identify or determine data to be transferred.

Data in a document may be an allocation amount (e.g. a bill payment amount). Allocation module 132 may invoke UI module 134 to modify the GUI for output via gesture-based I/O device 104 to reflect the input (e.g. selection) of the amount. Allocation module 132 may generate a signal comprising allocation information to instruct the performance of the allocation and communicate (e.g. via communication module 126) the signal such as to one or more of servers 114. Allocation module 132, UI module 134 and gesture module 136 may be configured to prompt and receive input to determine an allocation source (e.g. a source (account) from where the funds are to be taken) and an allocation destination (e.g. a destination (account or bill payee)) to where the funds are to be transferred.

In examples illustrated further herein, a swipe type gesture is enabled to define input such as to define the amount and to identify the allocation source and allocation destination. Other input types may be utilized. It will be understood that a swipe operation requires a continuous interaction with the interface elements of the device 104 and the device 104 can provide the user with interaction references to allow for easier targeting for the user. This is not the case for tap-based interfaces. These require the user to completely disconnect their interaction with the relevant module or component processing the tap interaction to retarget the next step (e.g. tap) in the interface. Such can lead to errors in inputting and thus errors in or otherwise wasted operations by the device or system with which the device is communicating as the device and/or system processes that erroneous input.

Figure 2:

FIGS. 2-11 are diagrams illustrating example graphical user interfaces, in accordance with one or more aspects of the present disclosure. FIG. 2 illustrates a GUI 200 for a data transfer in accordance with an example. The example comprises an allocation in the form of a bill payment by photo (e.g. an image capture using camera 124A). GUI 200 comprises component 202 such as for displaying instructions, component 204 for displaying an image 210 of the document (in this example an electricity bill) and an input control component 206 for receiving input to capture an image using the camera 124A. In the present example, allocation module 132 may be configured to communicate with camera 124A to capture the image. Gesture-based I/O device 104 in the present example is touch-sensitive and a representative user is illustrated as hand 208 representing a finger touch of the screen. Other touches such as multiple fingers, palm, etc., may be used. It is understood that input may be by way of a pointer or other gesture as discussed previously.

The document comprises various data which may be transferred in a data transfer, including an amount due, account number, etc. Other data includes the bill payer name, for example. The data transfer may be predefined to include certain limited data such as a data type, quantum (value of the data type) and data recipient, by way of example, such that the allocation module 132 is aware (i.e. programmed or configured such as via template, message definition or other structure) to complete this specific instance of the data transfer. For example the data type or possibly the recipient may be predefined such that only the quantum need be determined. In other instances additional information not necessarily present in the document is determined for the data transfer.

FIG. 3 shows GUI 300 (a continuation or update of GUI 200) where input is prompted (302) to select data to be transferred. A touch input 304 is received to select the amount 306. The touch input may be a double tap, long duration tap, hard tap or a swipe over the location of the data. In the present example, the image 210 is processed such as by OCR techniques (module 146) to convert images of text to text characters (e.g. ASCII or similar), for example, to aid in selection. The OCR operation may be performed immediately after the image is captured (as part of the update of GUI 200 to GUI 300) or in response to the user input to select the amount.

Figure 4:
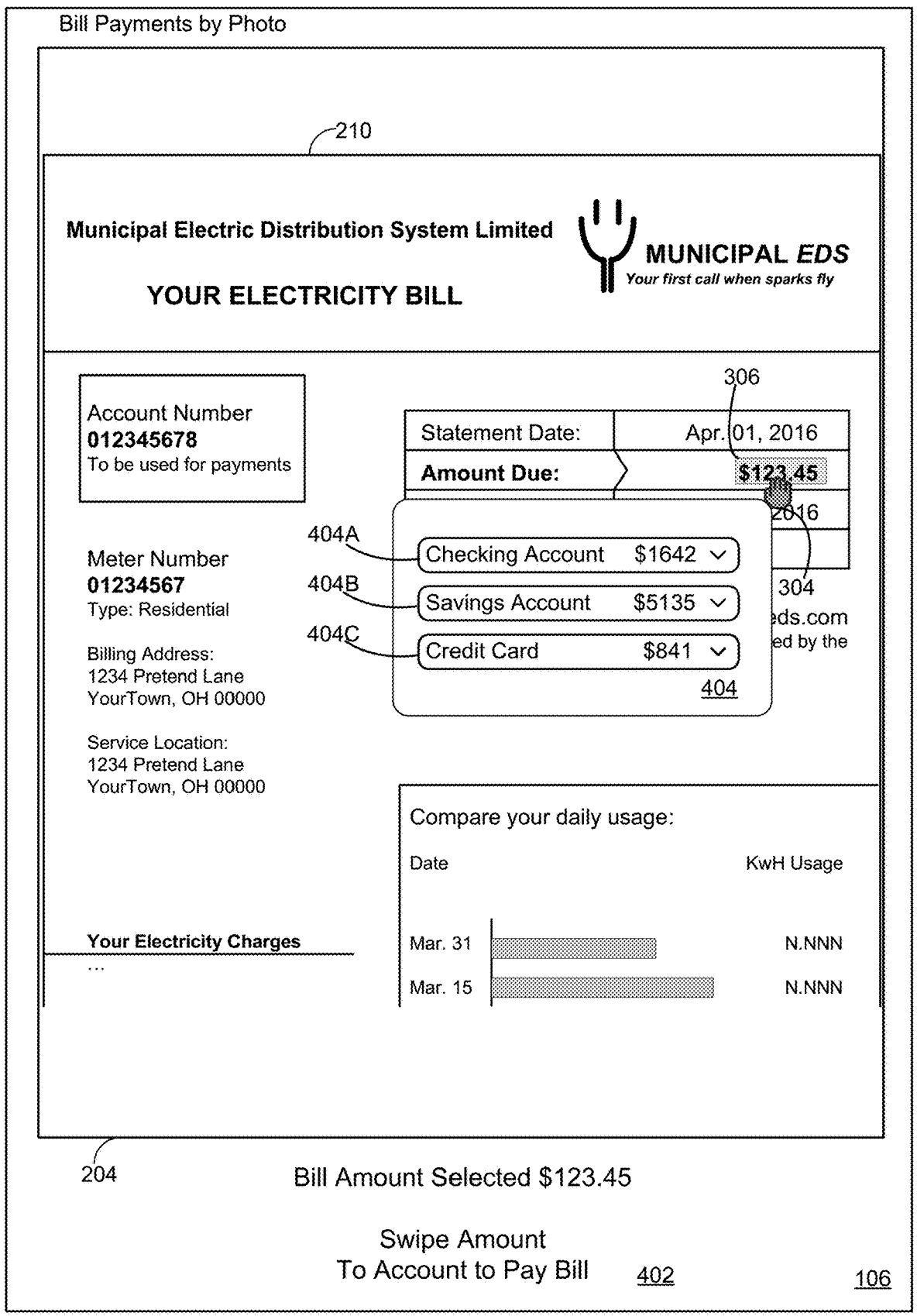

In accordance with the present example, the selection of the amount may automatically invoke further interfaces (e.g. GUI updates) to identify an allocation source and allocation destination. One order of the display of such interfaces is shown but any order may be provided. FIG. 4 shows GUI 400 including a prompt 402 to swipe the selected amount to the account (allocation source) to select the account from which the bill is to be paid. The GUI 400 comprises an overlay 404 over the image 210 of the document. The overlay may be positioned immediately adjacent the user input 304. Preferably, the user touch remains engaged with the screen following the amount selection to swipe the amount to one of the accounts represented in regions 404A, 404B and 404C of overlay 404. In this way, one continuous user touch (albeit of various components or events) can be processed, engaging the GUI continuously. A lift of the touch and a second or following touch requires additional processing as the gesture-based I/O device 104 and associated modules (gesture module 138, UI modules 134, allocation 132) are disengaged and reengaged, causing extra processing resources.

In some implementations, if the finger (or pointer as the case may be) is lifted (removed) before completing the selection of the allocation source, the lifting input terminates the continuous swipe gesture and may cancel the allocation. The finger may be lifted before or after the selection of the allocation source for example. If after, the selection of the allocation source may be reset and the GUI updated accordingly. The allocation amount may remain or be reset and the GUI updated.

In overlay 404, the account name or type and (optionally) balance amounts are shown and these data items may be obtained by allocation module 132 such as by communicating with one or more of servers 114. Though not shown, allocation module 132 may require a user authentication (sign in, etc.) to enable use of the allocation module 132.

Figure 5:
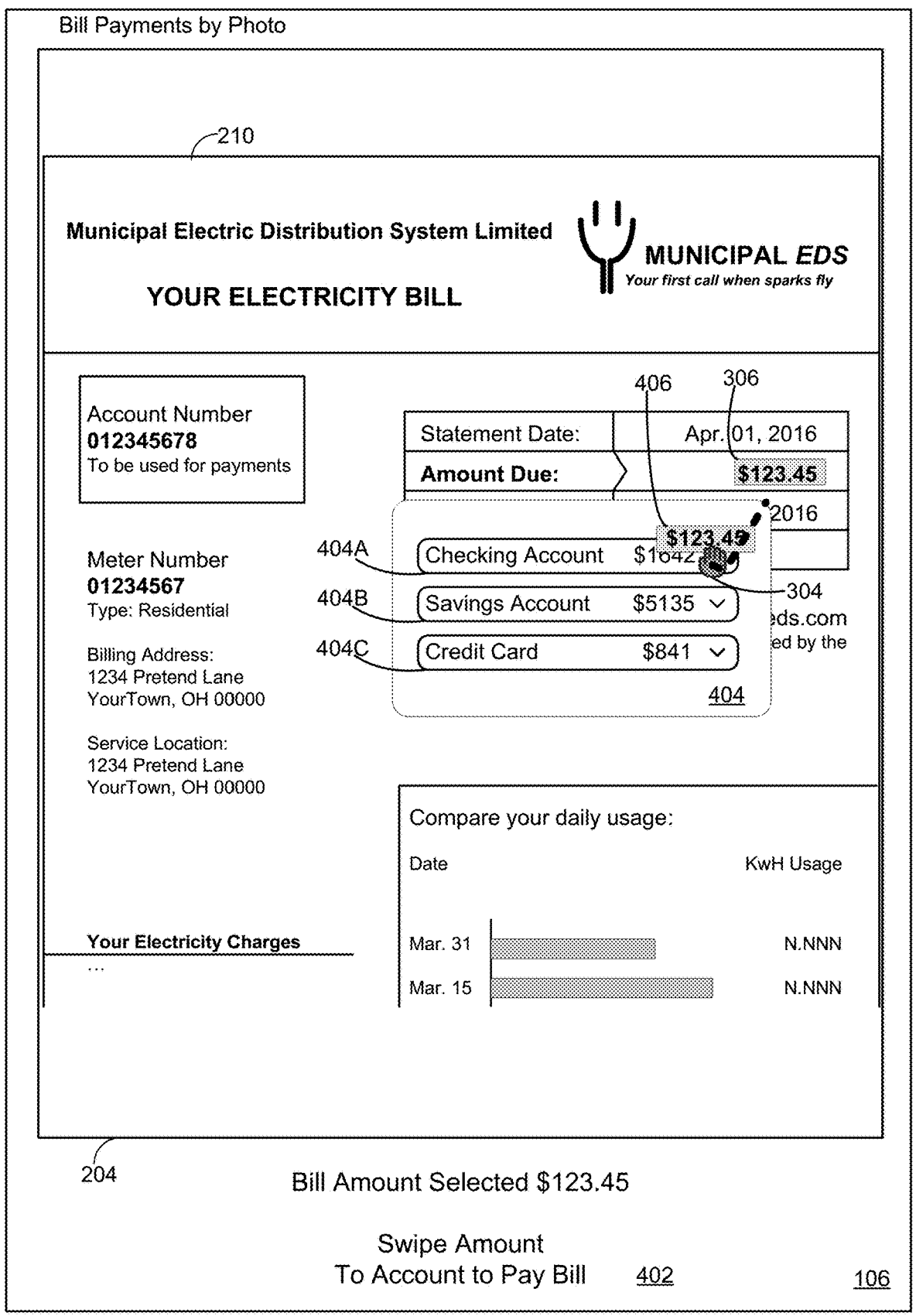

FIG. 5 shows updated GUI 500 as the amount is swiped in a first movement component to the desired account (allocation source). UI module 134 may (e.g. overlaying component 204) show a representation of the amount 406 successively moving from 306 toward an account (e.g. region 404A). The movement is illustrated for clarity in FIG. 5 by a bold dotted line, which ordinarily would not be shown in gesture-based I/O device 104.

Figure 6:
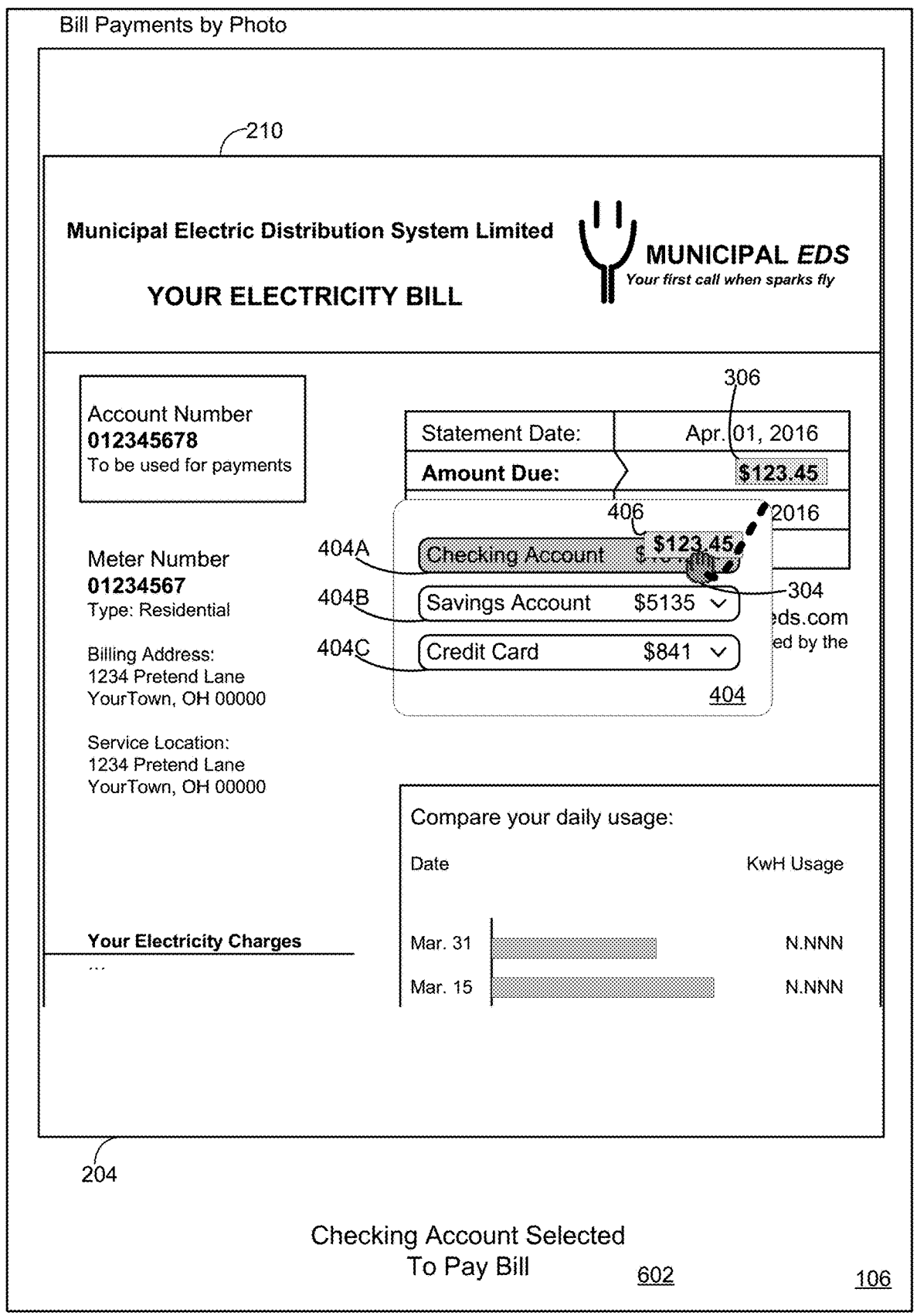

FIG. 6 shows a selection of account (allocation source) displayed within region 404A. Selection may be invoked by input received that denotes a pausing (a pause component or event) of the swipe over the account region 404A. GUI 500 is updated to show GUI 600 representing the selection such as by highlighting the account (changing a characteristic of the display). The GUI may be updated to indicate the selection of the particular source (e.g. checking account) such as by changing a colour or shade of the graphical element representing the allocation source at region 404A. A prompt in 602 may also confirm selection.

Next, FIG. 7 illustrates only a portion of gesture-based I/O device 104. Here GUI 700 is shown as an overlay 702 on overlay 404. Overly 702 comprises a plurality of regions showing allocation destinations, such as potential bill payees, to which the amount could be paid. To advance the data transfer and hence the allocation, the appropriate allocation destination is selected. Again, preferably the swipe 304 (represented by the hand and dotted line) is continued, without disengaging the gesture-based I/O device 104, in a second movement component toward the region showing the appropriate allocation destination. This region 704 is highlighted once selected. Selection may be a second pause component or a drop (disengagement). In the present example, the representation of the selected amount 406 does not follow the swipe 304 to the destination region but could do so. A cancel option is also presented. Data for the regions of overlay 702 representing bill payees or allocation destinations may be obtained from one of the other computing devices (e.g. servers) 114. These allocation destinations may be predefined bill payees. Bill payees may be predefined (e.g. set up in devices 114) by a user for reuse as desired. They may be predefined using a different interface (not shown) of device 102, of another computing device (not shown) or by other means (e.g. via a telephone interface with the financial institution, in-person request, etc.). Though a hand is shown representing a finger or fingers, etc. touching on a touch sensitive display screen, other gestural actions are included such as a pointer. As noted previously, the I/O devices may be a projector projecting a GUI and a camera capturing gestural actions from a hand, other body part or an object in the filed of view of a camera or a 3D scanner (e.g., any imaging device capable of capturing gesture and locational data such as in the form of a point cloud).

FIG. 8 shows a GUI 800 (on a portion of gesture-based I/O device 104) comprising a confirmation overlay 802 which may replace overlay 702. The confirmation prompts an input to complete (via Ok control 804) or cancel (via Cancel control 806) the data transfer for the transaction.

Figure 9:

FIG. 9 shows GUI 900 representing an alternative interface for selecting an allocation destination. In this example, a prompt 902 prompts an input 904 at an account region 906 to select an account number. This number may be used to identify the allocation destination for example. Rather than an account number another account identifier may be used or a bill payee name or identifier, etc. A look up may be performed using the account number, e.g. by searching the user's bill payees that have associated account numbers. The account number may be provided as part of the data transfer with the amount so that the servers 114 perform the look up. Alternatively, device 102 may receive bill payee data and perform the lookup and provide particular bill payee data determined from the lookup as part of the data transfer with the amount. Data for the lookup may be obtained from one or more of servers 114.

An allocation source may be determined in another manner to that shown. For example, an allocation source may be pre-associated to a bill payee (destination) such that payment to the bill payee comes from the same source (i.e. the selection of the destination selects the source automatically). Payment source may be input separately or through cookie use, etc.

The same accounts may be a source or a destination depending on the order in which they are chosen, for example, in accordance with the configuration of allocation module 132. It is also understood that some accounts may only be destination accounts such as for bill payments, transfers to individuals, etc. such that the accounts presented may differ after a source is selected. In other examples of allocation module 132, the destination account may be selected first. GUIs may be configured to display (or to output audibly) user instructions (prompts) about which account is to be selected first or other aspects of the data transfer. Alternatively in some examples the accounts may be selected in any order and structured automatically in a form to complete a bill payment data transfer as is described herein.

Figure 10:
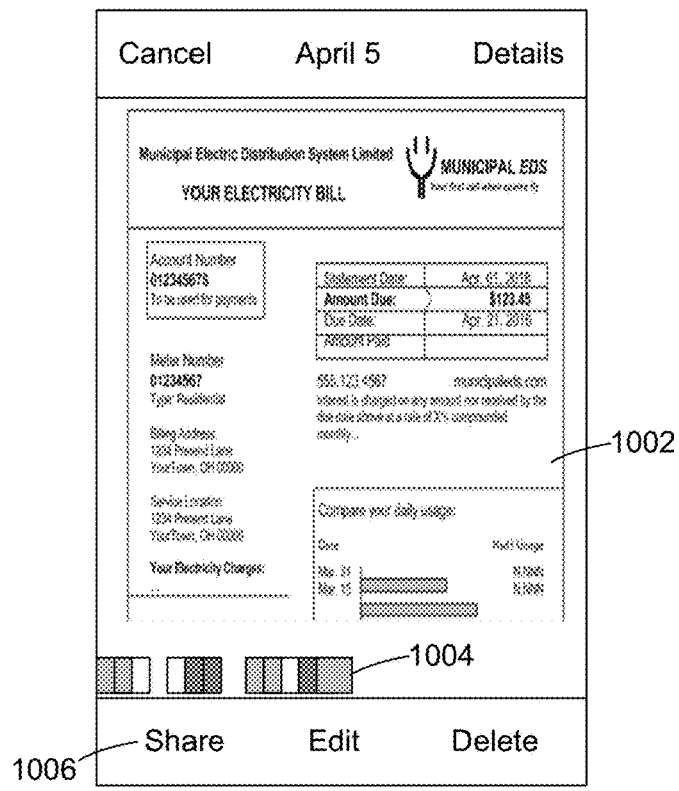

FIG. 10 shows a GUI 1000 such as for a photo application for displaying and managing photos or other images (e.g. stored to storage devices 130). These images may be captures received from camera 124A or received in other manners. GUI 1002 has a region for displaying a particular image, a region 1004 for receiving input to select an image to be viewed and/or managed and a region providing one or more controls (e.g. 1006) for managing the selected image. In the present example, region 1006 provides a share control to share the image itself with another application. Typically these other applications (e.g. email, message (SMS/text)), social media service (e.g. Twitter™, Facebook™, Instagram™, etc.) communicate the image itself to a service for delivery to one or more recipients or to user account at the service, etc. In the present instance, a bill pay control may be provided to pay a bill with data from the document. In other words, a data transfer may be initiated to transfer some data from the document.

Figure 11:
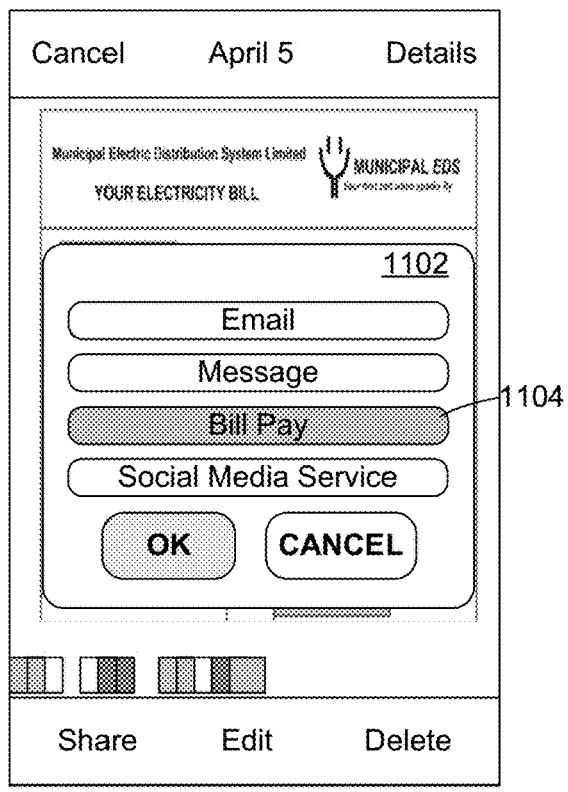

When the region 1006 providing the share control is invoked, a share GUI overlay or other interface style is displayed. FIG. 11 shows a GUI 1100 having such an overlay 1102. A plurality of respective specific share controls is shown in overlay 1102 including a bill payment control 1104, an instance of a data transfer control, which is highlighted. Invoking control 1104 invokes allocation module 132 with the document. As an image of the document is available, allocation module 132 may begin with GUI 300 rather than 200. Plug in module 142 may provide functionality to the photo application (an instance of apps. 140) or other applications to provide this new type of sharing to perform a data transfer.

Figure 12:
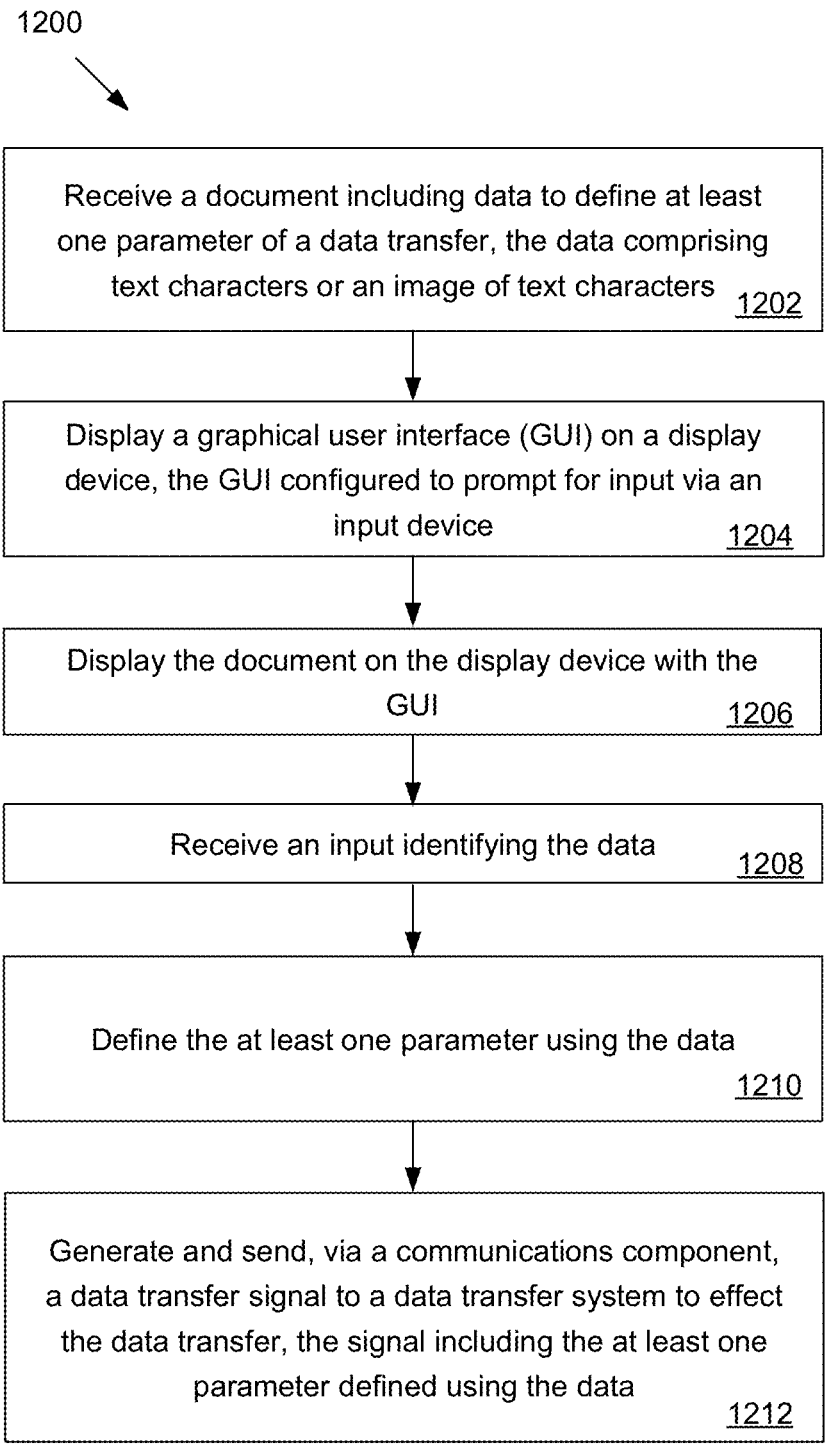
FIGS. 12-16 are flowcharts illustrating example operations of a computing device, in accordance with one or more aspects of the present disclosure.

FIG. 12 is a flowchart illustrating example operations 1200 of a computing device, in accordance with an aspect of the present disclosure. Operations 1200 perform a data transfer from computing device 102 to a data recipient including at least some data obtained from a document.

At 1202, operations receive a document including data to define at least one parameter of a data transfer. The data comprises text characters or an image of text characters. For example, the data may be a currency amount, account number, name, or other identifier. In some examples, the data may be useful to look up or otherwise determine the value (quantum) of the at least one parameter of the data transfer. The parameter may be the content of a message, a message destination or a message source. The document itself is not sent in the data transfer such that the data is less than the document.

The actual data transfer from the computing device 102 may be made to an intermediary for delivery to a data recipient. For example, the data transfer may be made to a service provider who then communicates directly or indirectly to the data recipient. In a bill paying context, the intermediary may be a financial services provider for the bill payor and this financial services provider may communicate with a financial services provider for the bill payee.

At 1204, operations display a graphical user interface (GUI) on a display device, the GUI configured to prompt for input via an input device. At 1206 operations display the document on the display device with the GUI.

At 1208, operations receive an input identifying the data. The data transfer may be predefined with a definition (e.g. a template or the like) including definitions for various parameters. The content (payload) may expect data from the document as described above. Some or a portion of the values/quanta of the parameters may be predefined.

At 1210 operations define the at least one parameter using the data. For example the selected data text may be used to define all or a portion of the content of the message. The data text may be used to look up or determine the parameter. If the data is an image operations may (e.g. at this point or earlier) convert the image to text characters (e.g. ASCII or similar) using OCR techniques.

At 1212, operations generate and send, via a communications component, a data transfer signal to a data transfer system to effect the data transfer, the signal including the at least one parameter defined using the data.

Figure 13:
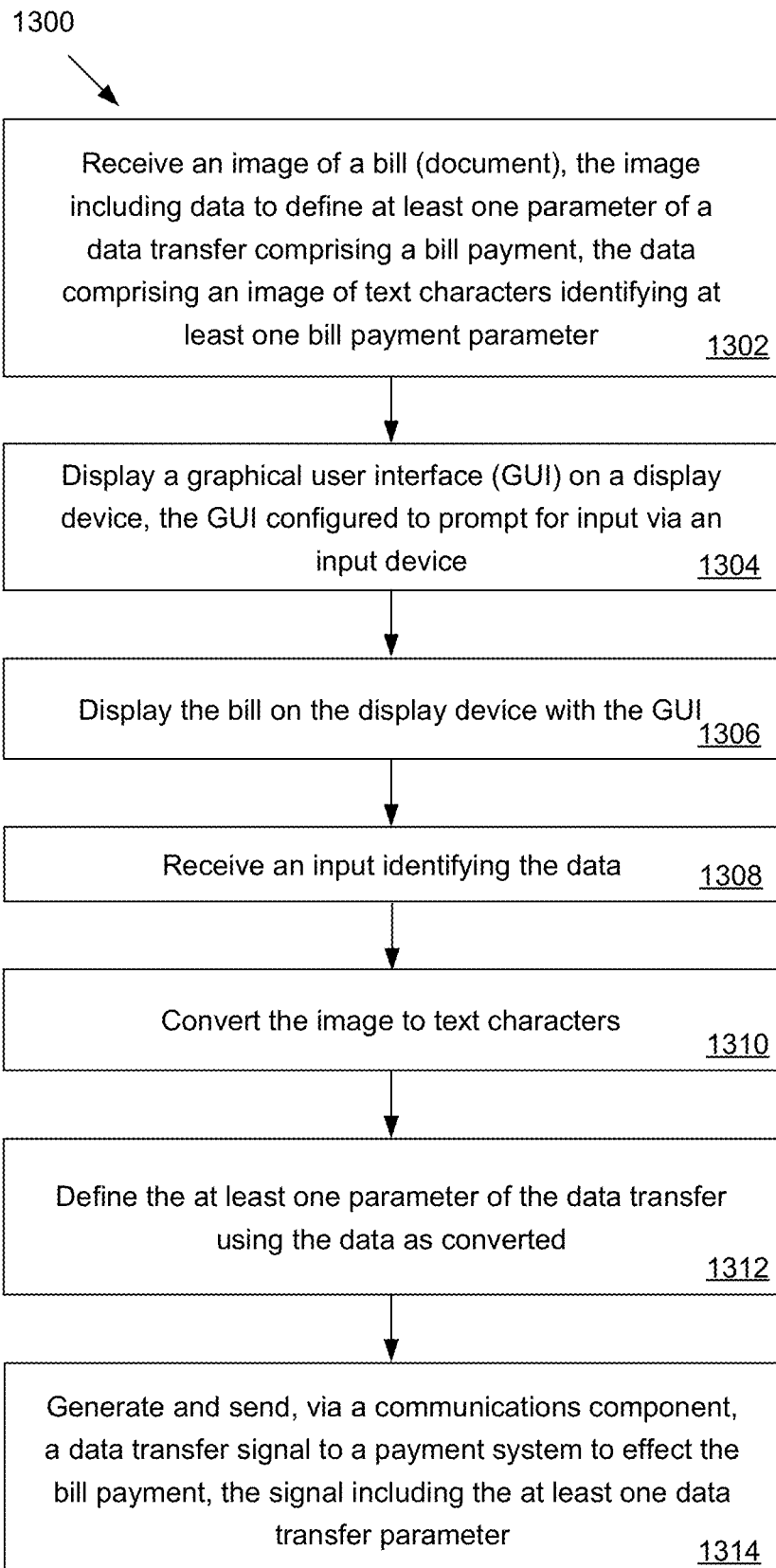

FIG. 13 shows a flow chart of operations 1300 for a computing device to make a bill payment. At 1302, operations receive an image of a bill (document) the image including data to define at least one parameter of a data transfer comprising a bill payment, the data comprising an image of text characters identifying at least one bill payment parameter (e.g. account or amount owed, bill payee, etc.). The bill may be received from a photo application communicating the image or by a camera capturing the image (and storing it to the storage device 130) or in another manner such as via communication unit(s) 126.

At 1304, operations display a GUI on gesture-based I/O device 104 and the GUI is configured to prompt for input via an input device. At 1306, operations display the bill on gesture-based I/O device 104 with the GUI.

At 1308, operations convert the image to text characters (e.g. using OCR). The text portions may be selectable in the GUI. At 1310 operations receive an input identifying the data. At 1312, operations define the at least one parameter of the data transfer using the data as converted. It is understood that the converting may occur before or after the input identifying the data is received.

At 1314, operations generate and send, via a communications component, a data transfer signal to a payment system to effect the bill payment, the signal including the at least one data transfer parameter. The signal may be sent to a server or servers (e.g. a bill payment system) of a financial services provider.

Figure 14:
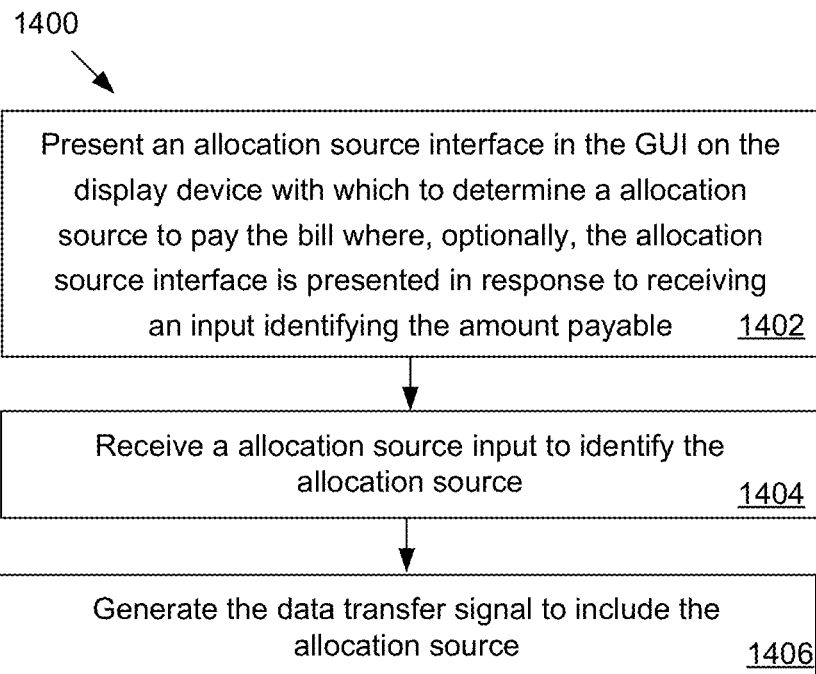
Figure 15:
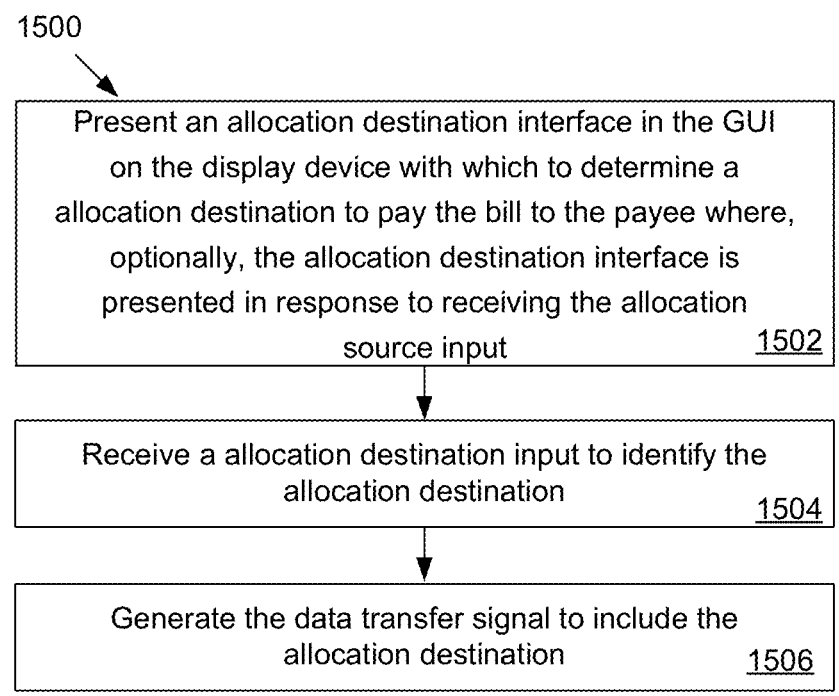

FIG. 14 is a flow chart showing operations 1400 in accordance with one aspect. Operations enable a selection of an allocation source (bill payment source) to determine an account from which the bill payment amount will be taken (debited). At 1402, operations present an allocation source interface in the GUI on the display device with which to determine an allocation source to pay the bill where, optionally, the allocation source interface is presented in response to receiving an input identifying the amount payable. At 1404, operations receive an allocation source input to identify the allocation source. At 1406, operations generate the data transfer signal to include the allocation source FIG. 15 is a flow chart showing operations 1500 in accordance with one aspect. Operations enable a selection of an allocation destination (bill payment destination or payee) to determine an account from which the bill payment amount will be paid (credited). At 1502, operations present an allocation destination interface in the GUI on the display device with which to determine an allocation destination to pay the bill to the payee where, optionally, the allocation destination interface is presented in response to receiving the allocation source input selecting or otherwise identifying the allocation source. At 1504, operations receive an allocation destination input to identify the allocation destination. At 1506, operations generate the data transfer signal to include the allocation destination.

With regard to operations to identify the allocation (payment) amount, the allocation source and the allocation destination and FIGS. 13-15, it will be understood that the order of presentation of the allocation amount, allocation source and allocation destination interfaces may be different. For example the allocation destination interface may be presented first, such as with a prompt asking which bill is to be paid and showing predefined allocation destinations (bill payees). Next may be an interface to identify the source or the amount. Other orders may be contemplated. If the amount interface is presented first, the destination interfaced may be presented second and in response to selecting or identifying the amount. The allocation source interface may be presented last and in response to selecting the allocation destination.

Preferably the interfaces of FIGS. 13 to 15 (or at least two of them) are continuous swipe enabled. That is, the swipe is one in which the touch or other gestural input continuously engages the GUI and device 104 to select the amount, destination and source (or at least two of them). In that way the underlying processing/control remains active and engaged and does not have to disengage (e.g. when touch is released) and reengage (when touch is reinitiated).

Figure 16:
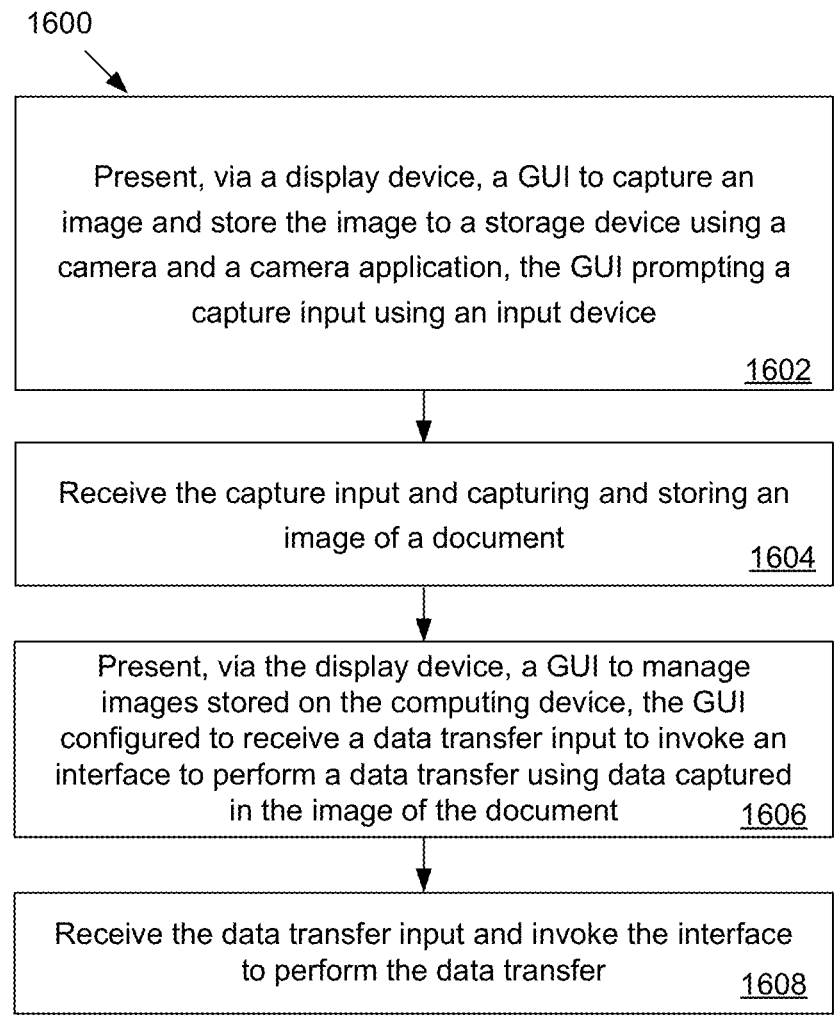

FIG. 16 is a flow chart showing operations 1600 in accordance with one aspect. Operations enable an application such as via a plug in to share a document with a data transfer application that performs a data transfer with at least some data taken from the document. At 1602, operations present, via a display device, a GUI to capture an image and store the image to a storage device using a camera and a camera application, the GUI prompting a capture input using an input device. At 1604, operations receive the capture input and capture and store an image of a document. It will be understood that operations 1602 and 1604 are standard camera application operations and not plug in operations. At 1605, plug-in operations may modify sharing functionality of the camera application or a photo/images presentation application to present, via the display device, a GUI to manage images stored on the computing device, the GUI configured to receive a data transfer input to invoke an interface to perform a data transfer using some of the data captured in the image of the document. At 1608, operations receive the data transfer input and invoke the interface to perform the data transfer. The data transfer interface may be as shown and described herein above. Similar operations (whether a plug-in or native functionality) to share or send a document to a data transfer interface may be configured for other document viewer/editor applications or an operating system or a file or document management application that provide an interface to manage or share documents or any or all of these.

Other examples of data transfers may be in relation to completing (filling in) forms on-line. Forms may be income tax forms or application forms (e.g. for a permit or license or a renewal or any other requirement), etc. By way of example, but not shown in the FIGS., a browser or other application may be configured or adapted to provide a control to invoke a data capture from a document, particularly an image. In a form to be completed a user may tap a field (or right click therein using a pointer device (mouse) to invoke a control interface such as for pasting data. One control may invoke a "copy/paste from image" option. The control may invoke a GUI similar to 200 which prompts input to capture a photo of a document using a camera and thereafter select a data item (text characters) in the document for populating the form. The image of the document may be processed to recognize text characters. Such processing may be performed to permit selection of the text in the GUI displaying the document on a display device. Once the data is identified, operational control may return to the browser or other application to complete the paste from image function. The browser or application may then generate and send a data transfer signal where one of the data transfer parameters in the signal (i.e. a portion of the content of the message being sent) is defined from the data pasted into the form. The data may be used to determine other content which is then sent in the signal.

Operations herein show that a data transfer interface may be provided which enables a data transfer using some data (text characters (at least alphabetic, numeric and combinations)) obtained from a document, particularly an image of a document. The data is identified via a received selection input indicating the data in the document that is to be used. Other parameters for the data transfer may also be received. Preferably a plurality of parameters (preferably 3 or more parameters) are identified by receiving a continuous swipe input that continuously engages the GUI until the plurality of parameters are identified.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Various embodiments of the invention have been described. These and other embodiments are within the scope of the following claims.

What is claimed is:

1. A computing device comprising:
   a processor;
   a display device coupled to the processor;
   a communications component coupled to the processor;
   an input device coupled to the processor; and
   a storage device coupled to the processor, the storage device storing instructions to configure operation of the computing device when executed by the processor, the computing device configured to:
   receive a document including data to define at least one parameter of a data transfer comprising an allocation from an allocation source to an allocation destination, the data comprising text characters or an image of text characters;
   display a graphical user interface (GUI) on the display device, the GUI prompting for input via the input device;
   display the document on the display device with the GUI;
   receive an input identifying an amount from the data in the document with which to define an amount of the allocation;
   define the at least one parameter using the amount;
   display an allocation source interface via the graphical user interface to present a plurality of allocation sources from which to identify the allocation source, the allocation source interface comprising an overlay over the document, wherein the overlay is positioned adjacent the input identifying the amount in the document;
   receive input associating the amount to the allocation source;
   define the at least one parameter to further include the allocation source; and
   generate and send, via the communications component, a data transfer signal to a data transfer system to effect the data transfer, the signal including the at least one parameter defined using the amount and the allocation source.

2. The computing device of claim 1 wherein the input device is a touch sensitive device and the input to identify the amount and the input to associate the amount to the allocation source is a gesture having a component to select the amount and a component to drag the amount to the allocation source.

3. The computing device of claim 1 wherein, one of:
   the computing device comprises a camera and wherein the computing device is configured to receive the document as an image from the camera; and
   the computing device is configured to receive the document using the communications component.

4. The computing device of claim 1 wherein the data comprises an image of text characters and wherein the computing device is further configured to convert the image using text recognition.

5. The computing device of claim 1 wherein the document is a bill and the allocation relates to a bill payment via a financial transaction.

6. The computing device of claim 1 wherein the plurality of allocation sources are selected from bank accounts, credit cards or other allocation sources for selection.

7. The computing device of claim 1 wherein the amount input and the allocation source input are portions of a same continuous gesture interacting with the GUI.

8. The computing device of claim 7 wherein the amount input comprises a pause or tap over data in the document comprising the amount as displayed in the GUI.

9. The computing device of claim 8 wherein the allocation source input comprises a swipe to the allocation source and a pause over the allocation source as displayed in the GUI.

10. The computing device of claim 5 further configured to generate the signal to include an allocation destination associated with a payee.

11. The computing device of claim 10 further configured to determine allocation destination information by:
    receiving an account input identifying an account or other identifier on the bill with which to identify the allocation destination; and defining the allocation destination in response to the account input.

12. The computing device of claim 10 further configured to determine the allocation destination information by:
presenting an allocation destination interface in the GUI via the display device with which to determine the allocation destination, the allocation destination interface presenting a plurality of allocation destinations; and
receiving an allocation destination input selecting the allocation destination;
wherein the input to identify the amount, the input to associate the amount to the allocation source and the input to identify the allocation destination consists of a single continuous swipe without releasing engagement with the input device, the single continuous swipe having a component to select the amount, a component to select the allocation source and a component to select the allocation destination.

13. The computing device of claim 12 wherein, at least one of:
the allocation destination interface is an overlay displayed over the bill in the GUI;
the allocation destination interface is presented in response to receiving an allocation source input; and
the allocation destination input is a portion of a continuous swipe in combination with at least one of an amount payable input and an allocation source input.

14. A computer-implemented method executed by one or more processing units of a computing device, the method comprising:
receiving a document including data to define at least one parameter of a data transfer comprising an allocation from an allocation source to an allocation destination, the data comprising at least one of text characters and an image of text characters;
displaying a graphical user interface (GUI) on a display device coupled to the computing device, the GUI prompting for input via an input device;
displaying the document on the display device with the GUI;
receiving an input identifying an amount from the data in the document with which to define an amount of the allocation;
defining the at least one parameter using the amount;
displaying an allocation source interface via the graphical user interface to present a plurality of allocation sources from which to identify the allocation source, the allocation source interface comprising an overlay over the document, wherein the overlay is positioned adjacent the input identifying the amount in the document;
receiving input associating the amount to the allocation source;
defining the at least one parameter to further include the allocation source; and
generating and sending, via a communications component, a data transfer signal to a data transfer system to effect the data transfer, the signal including the at least one parameter.

15. The method of claim 14 wherein the input device is a touch sensitive device and the input to identify the amount and the input to associate the amount to the allocation source is a gesture having a component to select the amount and a component to drag the amount to the allocation source.

16. The method of claim 14 wherein, one of:
the computing device comprises a camera and wherein the method comprises receiving the document as an image from the camera; and
the method comprises receive the document using the communication component.

17. The method of claim 14 wherein the data comprises an image of text characters and the method comprises converting the image using text recognition.

18. The method of claim 14 wherein the document is a bill and the allocation comprises a bill payment and wherein the method is further configured to:
determine an allocation destination:
presenting an allocation destination interface in the GUI comprising a plurality of allocation destinations from which to select the allocation destination; and
receive an allocation destination input selecting the allocation destination;
wherein the input to identify the amount, the input to associate the amount to the allocation source and the input to identify the allocation destination consists of a single continuous swipe without releasing engagement with the input device, the single continuous swipe having a component to select the amount, a component to select the allocation source and a component to select the allocation destination.

19. A computer readable medium comprising a non-transitory device storing instructions and/or data, which when executed by a processor of a computing device, the processor coupled to a memory, configure the computing device to:
receive a document including data to define at least one parameter of a data transfer comprising an allocation from an allocation source to an allocation destination, the data comprising at least one of text characters and an image of text characters;
display a graphical user interface (GUI) on a display device coupled to the computing device, the GUI configured to prompt for input via an input device;
display the document on the display device with the GUI;
receive an input identifying an amount from the data in the document with which to define an amount of the allocation;
define the at least one parameter using the amount;
display an allocation source interface via the graphical user interface to present a plurality of allocation sources from which to identify the allocation source, the allocation source interface comprising an overlay over the document, wherein the overlay is positioned adjacent the input identifying the amount in the document;
receive input associating the amount to the allocation source;
define the at least one parameter to further include the allocation source; and
generate and send, via a communications component, a data transfer signal to a data transfer system to effect the data transfer, the signal including the at least one parameter defined using the amount and the allocation source.

* * * * *